United States Patent
Islam et al.

(10) Patent No.: US 12,386,045 B1
(45) Date of Patent: Aug. 12, 2025

(54) ENHANCED LiDAR MEASUREMENTS USING CHIRP NONLINEARITIES

(71) Applicant: Apple Inc., Cupertino, CA (US)

(72) Inventors: Nurul Taimur Islam, Cupertino, CA (US); Helen H. Liang, Los Gatos, CA (US); Jack E. Graves, Sunnyvale, CA (US); Malcolm J. Northcott, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 808 days.

(21) Appl. No.: 17/577,039

(22) Filed: Jan. 17, 2022

Related U.S. Application Data

(60) Provisional application No. 63/149,677, filed on Feb. 16, 2021.

(51) Int. Cl.
 *G01C 3/08* (2006.01)
 *G01S 7/4912* (2020.01)
 *G01S 17/34* (2020.01)
 *G01S 17/58* (2006.01)

(52) U.S. Cl.
 CPC ............ *G01S 7/4917* (2013.01); *G01S 17/34* (2020.01); *G01S 17/58* (2013.01)

(58) Field of Classification Search
 CPC ......... G01S 7/4917; G01S 17/34; G01S 17/58
 See application file for complete search history.

(56) References Cited

U.S. PATENT DOCUMENTS

| | | |
|---|---|---|
| 9,529,079 B1 | 12/2016 | Droz et al. |
| 9,971,948 B1 | 5/2018 | Herrington et al. |
| 10,018,723 B2 | 7/2018 | Sromin et al. |
| 2017/0285325 A1 | 10/2017 | Erlich et al. |
| 2019/0025426 A1 | 1/2019 | Satyan et al. |
| 2020/0234785 A1 | 7/2020 | Kyselov et al. |
| 2021/0257396 A1 | 8/2021 | Piggott et al. |
| 2021/0314734 A1 | 10/2021 | Mehta et al. |
| 2021/0341611 A1 | 11/2021 | Boloorian |
| 2021/0373350 A1 | 12/2021 | Oda et al. |
| 2021/0405164 A1 | 12/2021 | Klemme et al. |
| 2021/0405194 A1* | 12/2021 | Tsuchida ................. G01S 17/34 |

(Continued)

FOREIGN PATENT DOCUMENTS

| | | | | |
|---|---|---|---|---|
| CN | 109541619 A | | 3/2019 | |
| CN | 110068828 A | * | 7/2019 | ............. G01S 17/34 |

(Continued)

OTHER PUBLICATIONS

Baumann et al., "Speckle Phase Noise in Coherent Laser Ranging: Fundamental Precision Limitations," Optics Letters, vol. 39, issue 16, pp. 4776-4779, Aug. 15, 2014.

(Continued)

*Primary Examiner* — Mark Hellner

(74) *Attorney, Agent, or Firm* — Meitar Patents Ltd.; Daniel Kligler

(57) ABSTRACT

A range sensing apparatus includes a modulator that applies a frequency chirp to a light source, causing a nonlinear variation in a frequency of an outgoing beam towards a target. A detector receives both a portion of the outgoing beam and a reflection of the outgoing beam from the target. A processor, which linearizes the frequency chirp, extracts characteristic signals with and without linearization of the chirps to identify a range and velocity of the target.

16 Claims, 6 Drawing Sheets

(56) References Cited

U.S. PATENT DOCUMENTS

| | | |
|---|---|---|
| 2022/0043108 A1 | 2/2022 | Lavian |
| 2022/0050201 A1 | 2/2022 | Sun et al. |
| 2022/0075076 A1 | 3/2022 | Michaels et al. |
| 2022/0113379 A1 | 4/2022 | Viswanatha et al. |
| 2022/0187457 A1 | 6/2022 | Daami |
| 2022/0404475 A1 | 12/2022 | Laflaquiere et al. |
| 2024/0069285 A1 | 2/2024 | Hajati |
| 2024/0369689 A1 | 11/2024 | Hajati et al. |
| 2025/0116763 A1 | 4/2025 | Spollard et al. |

FOREIGN PATENT DOCUMENTS

| | | | | |
|---|---|---|---|---|
| CN | 112083401 A | * | 12/2020 | ............ G01S 7/497 |
| CN | 115605774 A | | 1/2023 | |
| CN | 115932888 A | | 4/2023 | |
| DE | 102020213161 A1 | | 4/2022 | |
| EP | 3961257 A1 | | 3/2022 | |
| EP | 3971614 A1 | | 3/2022 | |
| ES | 2896302 T3 | | 2/2022 | |
| JP | 2021004800 A | * | 1/2021 | ............ G01S 17/36 |
| WO | 2018102190 A1 | | 6/2018 | |
| WO | 2020161260 A1 | | 8/2020 | |
| WO | 2020190338 A1 | | 9/2020 | |
| WO | 2022168500 A1 | | 8/2022 | |
| WO | 2023012527 A1 | | 2/2023 | |

OTHER PUBLICATIONS

Islam et al., U.S. Appl. No. 17/742,419, filed May 12, 2022.
Islam et al., U.S. Appl. No. 17/863,419, filed Jul. 13, 2022.
Cohen, U.S. Appl. No. 17/838,217, filed Jun. 12, 2022.
Kamali et al., "A review of dielectric optical metasurfaces for wavefront control," Nanophotonics, Open Access, pp. 1-84, May 18, 2018.
Xiong et al., "Controlling the degrees of freedom in metasurface designs for multi-functional optical devices," Nanoscale Advances, vol. 1, pp. 3786-3806, year 2019.
Wikipedia, "Laser speckle contrast imaging," pp. 1-8, last edited Dec. 12, 2023.
Li et al., "Transmissive-detected laser speckle contrast imaging for blood flow monitoring in thick tissue: ," from Monte Carlo simulation to experimental demonstration, Nature, Light: Science & Applications, vol. 10, article No. 241, pp. 1-43, Dec. 3, 2021.
Heeman et al., "Clinical applications of laser speckle contrast imaging: a review," Journal of Biomedical Optics, vol. 24, No. 8, pp. 080901-1-80901-11, Aug. 2019.
Zalevsky et al., "Simultaneous remote extraction of multiple speech sources and heart beats from secondary speckles pattern," Optics Express, vol. 17, No. 24, pp. 1-15, Nov. 23, 2009.
Vasilyev, "The Optoelectronic Swept-Frequency Laser and Its Applications in Ranging, Three-Dimensional Imaging, and Coherent Beam Combining of Chirped-Seed Amplifiers," Doctoral Thesis, California Institute of Technology, pp. 1-177, year 2013.
International Application # PCT/US2023/084979 Search Report dated Mar. 12, 2024.
Ding et al., "Compensation of Laser Frequency Tuning Nonlinearity of a Long Range OFDR Using Deskew Filter," Optics Express, vol. 21, No. 3, pp. 3826-3834, Feb. 11, 2013.
Du et al., "Method for Improving Spatial Resolution and Amplitude by Optimized Deskew Filter in Long-Range OFDR," IEEE Photonics Journal, vol. 6, No. 5, pp. 1-13, Oct. 2014.
Sandborn, "FMCW Lidar: Scaling to the Chip-Level and Improving Phase-Noise-Limited Performance," Dissertation, Electrical Engineering and Computer Sciences, University of California at Berkeley, USA, pp. 1-90, Dec. 1, 2019.
Meta et al., "Signal Processing for FMCW SAR," IEEE Transactions on Geoscience and Remote Sensing, voume 45, No. 11, pp. 3519-3532, Nov. 2007.
Peek, "Estimation and Compensation of Frequency Sweep Nonlinearity in FMCW Radar," M.Sc. thesis in Applied Mathematics, The University of Twente, The Netherlands, pp. 1-67, Sep. 2011.
Meta et al., "Range Non-Linearities Correction in FMCW SAR," IEEE, pp. 403-406, year 2006.
Kendrisic et al., "Thermally Tuned VCSEL-Based SS-OCT System," Biophotonics Congress: Biomedical Optics (Translational, Microscopy, OCT, OTS, Brain), Optica Publishing Group, pp. 1-2, year 2022.
Axelrod et al., "Reconfigurabe Quasi-Resonance Scanner for 3D FMCW Imaging," Optics Letters, vol. 39, issue 16, pp. 4776-4779, year 2014.
Northcott et al., U.S. Appl. No. 18/094,999, filed Jan. 10, 2023.
Shnaiderman et al., U.S. Appl. No. 18/094,997, filed Jan. 10, 2023.
Shnaiderman et al., U.S. Appl. No. 18/314,843, filed May 10, 2023.
Oggier et al., U.S. Appl. No. 18/113,104, filed Feb. 23, 2023.
Wang, "Investigation of New Concepts and Solutions for Silicon Nanophotonics," Doctoral Thesis in Microelectronics and Applied Physics, Stockholm, Sweden, pp. 1-91, year 2010.
Sacher et al., "Wide Bandwidth and High Coupling Efficiency Si3N4-on-SOI Dual-level Grating Coupler," Optics Express, vol. 22, No. 9, pp. 1-10, May 5, 2014.
Rogers et al., "A Universal 3D Imaging Sensor on a Silicon Photonics Platform," ArXiv:2008.02411v3, pp. 1-18, Nov. 11, 2020.
Lumerical Inc., "Tutorial—Splitter Optimization," pp. 1-8, year 2019, as downloaded from https://lumopt.readthedocs.io/en/latest/tutorial.html.
Nicolaescu et al., "3D Imaging via Silicon-photonics-based LIDAR," Proc. SPIE vol. 11691, Silicon Photonics XVI, pp. 1-12, year 2021.
Marchetti et al., "Coupling Strategies for Silicon Photonics Integrated Chips [Invited]," Photonics Reseach, vol. 7, No. 2, pp. 1-39, Feb. 2019.
Marchetti et al., "High-efficiency Grating-couplers: Demonstration of a New Design Strategy," Springer Nature, Scientific Reports, vol. 7, pp. 1-9, Nov. 2017.
Hooten et al., "Inverse Design of Grating Couplers Using the Policy Gradient Method from Reinforcement Learning," De Gruyter, Nanophotonics, vol. 10, issue 15, pp. 3843-3856, year 2021.
Michaels, "A Hierarchical Approach to the Design and Optimization of Photonics," PhD Thesis, University of California, Berkeley, pp. 1-139, year 2019.
Molesky, "Outlook for Inverse Design in Nanophotonics," arXiv:1801.06715v1, pp. 1-13, Jan. 20, 2018.
International Application # PCT/US2023/066803 Search Report dated Jul. 27, 2023.
Huang et al, Optica Publishing Group, Jul. 12, 2022, doi: https://doi.org/10.1364/OL.463007, 4 pages.
US Office Action U.S. Appl. No. 17/742,419, dated Jun. 6, 2025.
JP Office Action Patent Application No. 2024-115446 dated Jun. 2, 2025.

* cited by examiner

ENHANCED LiDAR MEASUREMENTS USING CHIRP NONLINEARITIES

CROSS-REFERENCE TO RELATED APPLICATION

This application claims the benefit of U.S. Provisional Patent Application 63/149,677, filed Feb. 16, 2021, which is incorporated herein by reference.

FIELD OF THE INVENTION

The present invention relates generally to systems and methods for optical sensing, and particularly to FMCW LiDAR sensing.

BACKGROUND

In certain LiDAR sensing arrangements, a radio-frequency (RF) chirp is applied to modulate the frequency of the beam of light (typically a single-mode laser beam) that is directed toward a target. The light reflected from the target is mixed with a sample of the transmitted light and detected by a photodetector, such as a balanced photodiode, which then outputs an RF signal at a beat frequency that is proportional to the distance to the target. When the target is moving, the resulting Doppler shift of the reflected light will cause the beat frequency to increase or decrease, depending on the direction of motion. By comparing the beat frequencies obtained from chirps of positive and negative slopes, it is thus possible to extract both the range and the velocity of the target. In the ideal case, if the beat frequency due to the Doppler shift is d, and the beat frequency due to the chirp and range is r, then the measured beat frequency for the up-chirp will be $f_u$=d+r, and the beat frequency on the down-chirp will be $f_d$=d−r. Thus, the sum of the measured up and down chirp frequencies reveals the Doppler shift, and the difference the range.

One of the practical problems is that the frequency chirp of the light source tends to be non-linear, i.e., the frequency variation over time deviates from an ideal linear sawtooth (triangular) shape. As a consequence, the beat frequency peak that is output from the photodetector may spread, resulting in degraded range resolution, accuracy, and signal/noise ratio (SNR). A similar sort of problem is encountered in the related area of optical frequency-domain reflectometry (OFDR).

Ding et al. present a model and solutions to this problem in an article entitled "Compensation of laser frequency tuning nonlinearity of a long range OFDR using deskew filter," published in *Optics Express* 21:3 (2013), pages 3826-3834, which is incorporated herein by reference. According to this model, the beat signal I(t) output from an OFDR interferometer can be expressed as:

$$I(t) \propto \cos\left[2\pi\left(f_b t + f_0 \tau + \frac{1}{2}\gamma\tau^2 + e(t) - e(t-\tau)\right)\right].$$

In this expression, $f_0$ is the optical frequency, $\tau$ is the propagation time of the light to and from the target, $\gamma$ is the frequency tuning rate of the chirp, $f_b = \gamma_t$ is the beat frequency, and e(t) is the nonlinear phase component of the laser frequency tuning function. The nonlinear phase component can be estimated by the following expression, using the beat signal measured at a reference propagation time $\tau_{ref}$:

$$e(t) = \left(\int^t \frac{\emptyset(t')}{\tau_{ref}} + \frac{1}{2}\frac{d\emptyset(t')}{dt'} + \frac{\tau_{ref}}{12}\frac{d^2\emptyset(t')}{dt'^2} + H.O.\right)dt'.$$

wherein $\emptyset(t') = e(t') - e(t' - \tau_{ref})$, and H.O. indicates higher order terms. This expression is taken from an article by Du et al., entitled "Method for Improving Spatial Resolution and Amplitude by Optimized Deskew Filter in Long-Range OFDR," in *IEEE Photonics Journal* 6:5 (2014), pages 1-11, which is also incorporated herein by reference.

The terms "light" and "optical radiation," as used in the context of the present description and in the claims, refer to electromagnetic radiation in any of the visible, ultraviolet, and infrared spectral bands.

SUMMARY

Embodiments of the present invention that are described hereinbelow provide improved methods and devices for LiDAR sensing.

There is therefore provided, in accordance with an embodiment of the invention, range sensing apparatus, including a light source, which is configured to transmit an outgoing beam of optical radiation toward a target, and a modulator, which is coupled to apply a frequency chirp to the light source, which causes a nonlinear variation in a frequency of the outgoing beam over a period of the frequency chirp. A detector is configured to receive both a portion of the outgoing beam and a reflection of the outgoing beam from the target, and to output beat signals corresponding to a frequency difference between the outgoing and reflected beams. A processor is configured to linearize the frequency chirp, to receive a first beat signal from the detector responsively to the linearized frequency chirp, to receive a second beat signal from the detector without linearizing the frequency chirp, and to measure a range and velocity of the target based on a comparison of the first and second beat signals.

In a disclosed embodiment, the processor is configured to extract a first beat frequency from the first beat signal and to extract a second beat frequency from the second beat signal, and to measure the range and velocity of the target based on the first and second beat frequencies.

In one embodiment, the processor is configured to drive the modulator so as to linearize the frequency chirp that is applied to the light source.

In another embodiment, the processor is configured to correct a phase error in the beat signal so as to linearize the frequency chirp. Typically, the frequency chirp includes multiple phases, including alternating up-ramp phases and down-ramp phases, and the processor is configured, in a disclosed embodiment, to extract both a first beat frequency and a second beat frequency from a single one of the phases, and to measure the range and velocity of the target based on the first and second beat frequencies.

In some embodiments, the detector is configured to receive multiple incoming beams reflected from multiple targets, and the processor is configured to extract multiple first beat frequencies from the first beat signal, to extract multiple second beat frequencies from the second beat signal, and to disambiguate respective ranges and velocities of the multiple targets by comparing the multiple first and second beat frequencies.

Additionally or alternatively, the processor is configured to store a record of a dependence of a deviation between the first and second beat signals on the range of the target, and to apply the record in measuring the range and velocity based on the first and second beat signals. In a disclosed embodiment, the record is indicative of the dependence of the deviation between the first and second beat signals on the range and velocity of a target, and the processor is configured to measure the deviation between the first and second beat signals, and to compare the measured difference to the difference indicated by the record in order to estimate a direction and speed of movement of a moving target.

There is also provided, in accordance with an embodiment of the invention, a method for range sensing, which includes transmitting an outgoing beam of optical radiation toward a target while applying a frequency chirp to cause a nonlinear variation in frequency of the outgoing beam over a period of the frequency chirp. A detector receives both a portion of the outgoing beam and a reflection of the outgoing beam from the target, so that the detector outputs beat signals corresponding to a frequency difference between the outgoing and reflected beams. The frequency chirp is linearized, and a first beat signal is received from the detector responsively to the linearized frequency chirp. A second beat signal is received from the detector without linearizing the frequency chirp. A range and velocity of the target are measured based on a comparison of the first and second beat signals.

The present invention will be more fully understood from the following detailed description of the embodiments thereof, taken together with the drawings in which:

DETAILED DESCRIPTION OF EMBODIMENTS

Figure 1:
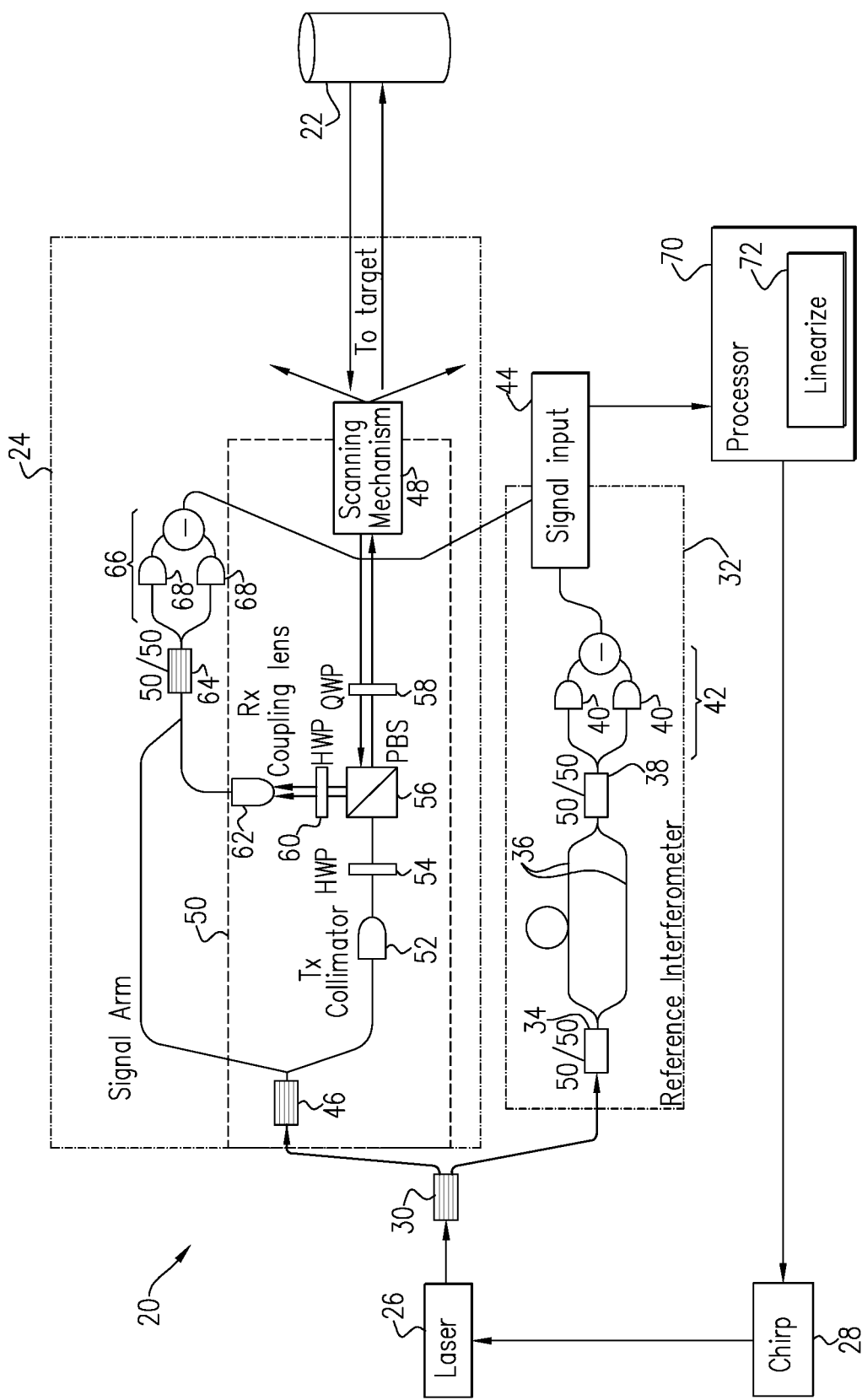
FIG. 1 is a block diagram that schematically in accordance with an illustrates an LiDAR system, embodiment of the invention.

When a linear RF modulation signal is applied to the laser transmitter in a frequency modulated continuous wave (FMCW) LiDAR system, the actual frequency variation of the outgoing laser beam typically includes a nonlinear component. This nonlinearity is commonly regarded as a problem, which is corrected in order to obtain accurate range and velocity measurements from the beat signal that is output by the detector.

Embodiments of the present invention turn this perceived problem into an advantage, by using the nonlinearity of the frequency variation to disambiguate the measurement of range and velocity, and specifically to ascertain whether the target or targets are moving or static. As noted earlier, when the frequency variation of the laser beam is linearized, it is generally necessary to compare the beat frequencies obtained from chirps of positive and negative slopes in order to extract both the range and the velocity of the target. In the present embodiments, however, the range and velocity are measured by comparing the different beat frequencies that are obtained with and without linearization of the frequency chirp. By appropriate signal processing, as described hereinbelow, it is possible in this manner to extract both of the beat frequencies from a single phase-either up-ramp or down-ramp—of a frequency chirp, and thus to increase the speed of operation and throughput of the LiDAR system, i.e., to increase the number of independent points measured by the system.

The term "without linearization," as used in the context of the present description and in the claims, refers not only to cases in which no linearization at all is applied to the frequency chirp, but also to implementations in which the chirp is partly linearized, not but fully linearized, leaving some residual nonlinearity. Conversely, a small amount of residual nonlinearity may remain even after linearization of frequency chirp. Thus, references herein to receiving beat signals with and without linearization of the frequency chirp should be understood as referring generally to receiving a first beat signal with a greater degree of linearization of the frequency chirp and a second beat signal with a lesser degree of linearization of the frequency chirp. The degree of nonlinearity may be measured, for example, in terms of the magnitude of the nonlinear phase component e(t), as defined above.

Additionally or alternatively, when the FMCW LiDAR system receives multiple incoming beams reflected from multiple targets, the comparison of the multiple beat frequencies that are extracted from the beat signal can be used to correctly pair the multiple returns in the up- and down-chirps, by looking for consistency in the velocity determined by adding the up and down chirp frequencies, and by using the single-chirp velocity determination method described here.

In the disclosed embodiments, a light source, such as a laser, transmits an outgoing beam of optical radiation toward a target, while a modulator applies a frequency chirp to the light source. This chirp causes a nonlinear variation in the frequency of the outgoing beam over the period of the chirp. A detector receives the incoming beam reflected from the target, along with a portion of the outgoing beam. Mixing of these beams causes the detector to output a beat signal corresponding to the instantaneous frequency difference between the outgoing and incoming beams. A processor linearizes the frequency chirp, either by appropriately driving the modulator and/or by correcting the estimated phase error in the beat signal, and extracts a first beat frequency from the resulting beat signal. The processor also extracts a second beat frequency from the beat signal that is obtained without linearizing the frequency chirp (i.e., no linearization or only partial linearization). The processor measures the range and velocity of the target based on a comparison of these first and second beat frequencies.

FIG. 1 is a diagram block that schematically illustrates an FMCW LiDAR system 20 with chirp linearization, in accordance with an embodiment of the invention. System 20 measures a range and velocity of a target 22 relative to a LiDAR sensor 24. The specific components of system 20 are shown and described here, by way of example, for the sake of clarity and concreteness. The principles of the present invention, however, may be implemented, mutatis mutandis, in substantially any sort of FMCW LiDAR apparatus that is known in the art. All such alternative implementations are considered to be within the scope of the present invention.

In system 20, a tunable laser 26 outputs a narrowband, single-mode beam of optical radiation, which is directed by sensor 24 toward target 22. A modulator 28, typically driven by an RF signal generator, applies a frequency chirp to laser 26, which causes a nonlinear variation in the frequency of the outgoing beam over the period of the chirp. The nonlinearity may simply be inherent in the modulation characteristics of laser 26, even when the chirp signal applied by modulator 28 is itself linear. Alternatively or additionally, the chirp signal may be intentionally made nonlinear.

A beamsplitter 30 splits off a small portion of the laser beam to a reference interferometer 32, for the purpose of accurately monitoring the modulation of the laser beam. In the pictured example, reference interferometer 32 comprises a beamsplitter 34, which divides the beam between a pair of single-mode optical fibers 36 of different lengths, in a Mach-Zehnder configuration. The beams output by the fibers are combined and then split by a beamsplitter 38 between a pair of photodiodes 40 in a balanced photodiode device 42. The resulting reference beat signal is received by a signal input circuit 44 for digitization and further processing.

Beamsplitter 30 directs most of the laser beam energy to sensor 24, where a further beamsplitter 46 splits off a small part of the outgoing beam to serve as a reference, while passing most of the to a beam energy transmitter/receiver 50. Transmit optics 52 collimate and direct the outgoing laser beam through a half-wave plate 54, via a polarizing beamsplitter 56 and a quarter-wave plate 58, toward target 22. In the pictured embodiment, a scanning mechanism 48, such as a rotating mirror, scans the outgoing over a range of angles in order to create a range and velocity map of an extended target area. Alternatively or additionally, an array of sensors can be used for this purpose.

The incoming beam reflected from target 22 passes through quarter-wave plate 58 and is reflected by beamsplitter 56 through a half-wave plate 60. (This arrangement is shown by way of example, and various other receiver configurations will be apparent to those skilled in the art.) Receive optics 62 couple the incoming beam into a waveguide, which directs the incoming beam toward a beamsplitter 64, which mixes the incoming beam with the part of the outgoing beam that was split off to serve as a reference. The mixed incoming and outgoing beams are input to a detector 66, comprising a pair of photodiodes 68 in a balanced photodiode configuration. Detector 66 outputs a beat signal, corresponding to the instantaneous frequency difference between the outgoing and incoming beams, to input circuit 44.

A processor 70 extracts the beat frequencies from the signals received by input circuit 44, for example by transforming the signals to the frequency domain and finding the frequency peaks. A linearization module 72 in processor 70 linearizes the frequency chirp, either by driving modulator 28 so as to linearize the frequency of the actual chirp in the laser beam, or by correcting the phase error in the beat signal that is received from input circuit 44 (or both). In the former case, linearization module 72 may, for example, add a nonlinear component to the drive signal applied to modulator 28 in order to compensate for the nonlinearity in the modulation characteristics of the laser frequency. In the latter case, linearization module may apply a suitable signal processing algorithm to the beat signal received from input circuit 44. This latter approach is described further below.

As the result of the operation of linearization module 72, processor 70 is able to extract the beat frequencies from two different beat signals: one beat signal following linearization of the frequency chirp (by either of the linearization techniques described above), and the other beat signal without linearization of the frequency chirp. (This latter beat signal is referred to below as the "non-linearized beat signal," regardless of whether the corresponding frequency chirp has been partially linearized or not linearized at all.) When linearization is applied by processing the signal received from input circuit 44, processor 70 is able to obtain both the linearized and non-linearized beat signals simultaneously from the same input signal provided by input circuit 44. Regardless of how the linearization is carried out, processor 70 compares the beat frequencies with and without linearization in order to measure the range and velocity of target 22.

Processor 70 typically comprises a general-purpose, programmable microprocessor or microcontroller, which is programmed in software to carry out the functions that are described herein, including the functions of linearization module 72. This software may be downloaded to processor 70 in electronic f form, for example over a network. Alternatively or additionally, the software may be stored in tangible, non-transitory computer-readable media, such as electronic, optical, or magnetic memory. Further alternatively or additionally, at least some of the functions of processor 70 may be implemented in a digital signal processor (DSP) or in hardware logic circuits, which may be hard-wired or programmable.

Figure 2A:
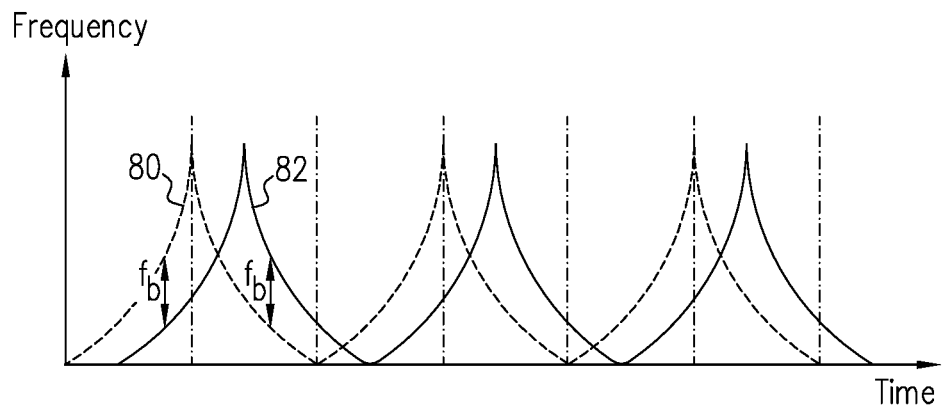
FIGS. 2A and 2B are plots that schematically illustrate transmitted and received LiDAR signals with chirp nonlinearity.
Figure 2B:
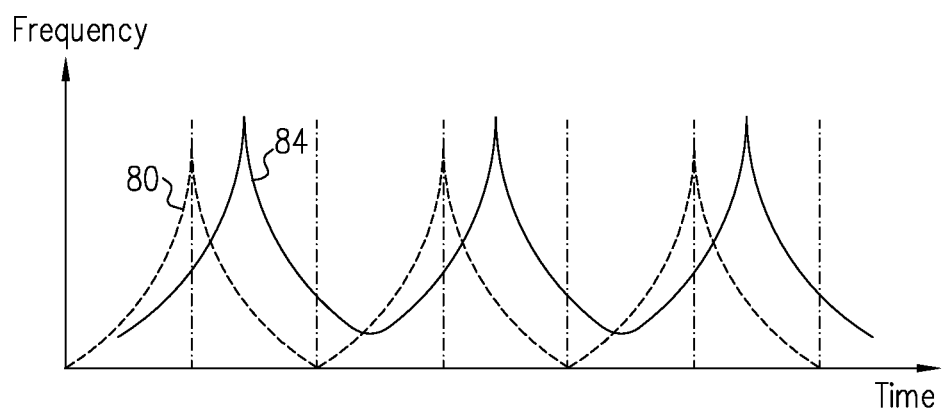

FIGS. 2A and 2B are plots that schematically illustrate transmitted and received FMCW LiDAR signals with chirp nonlinearity. A curve 80 shows the frequency variation over time of the transmitted beam, while curves 82 and 84 show the frequency variations of the beams reflected from stationary and moving targets, respectively. The instantaneous frequency difference $f_b$ between curves 80 and 82 causes detector 66 (FIG. 1) to output a beat signal at frequency $f_b$. The delay between curves 80 and 82 increases with the distance (or equivalently, with the propagation time t) to the target, and thus $f_b$ increases, as well, with target distance. Because of the nonlinearity of the curves, however, the frequency difference between curves 80 and 82 is not constant, but rather varies over the period of the chirp.

In the case of the moving target, the Doppler shift of the reflected beam shifts curve 84 upward in frequency, relative to curve 80 (assuming the target to be moving toward the detector, or downward when the target is moving away). In the case of a moving target, $f_b$ will have different values during the up-ramp and down-ramp phases of the chirp. Both the up-ramp and down-ramp values, however, will vary due to the nonlinearity of the chirp.

The nonlinear phase component of the beat signals, e(t), can be estimated from the beat signals themselves using the formulas presented above in the Background section. This estimation may be carried out by processor 70 during run-time e of system 20. Alternatively or additionally, the nonlinear phase function may be pre-calibrated, and a record of the calibration may be stored in a memory for application by linearization module 72. As noted earlier, the linearization module may apply the calibration either to linearize the modulation of the outgoing beam or to correct the phase error in the beat signal received from detector 66.

Figure 3A:
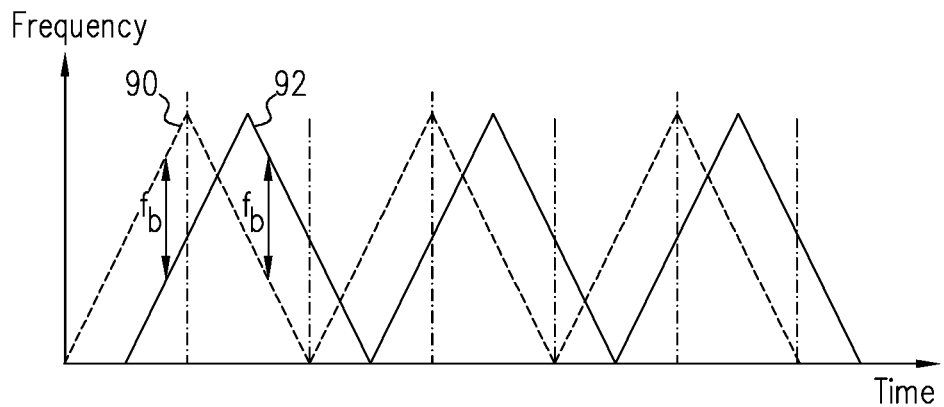
FIGS. 3A and 3B are plots that schematically illustrate transmitted and received LiDAR signals following linearization of the chirp, in accordance with an embodiment of the invention.
Figure 3B:
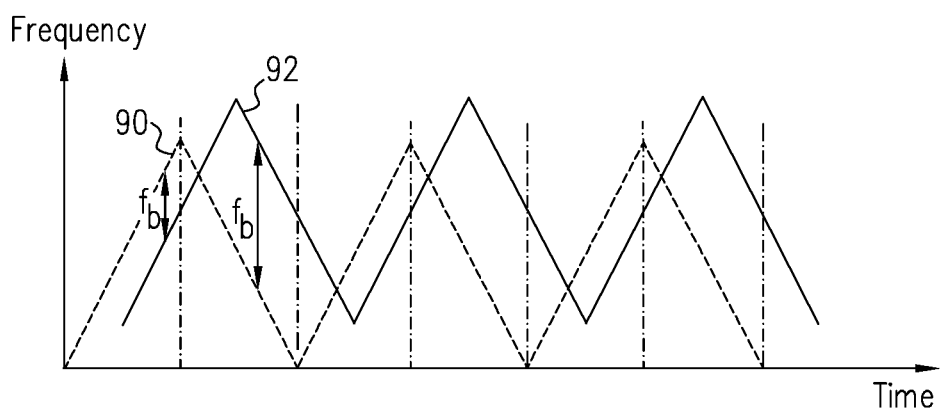

FIGS. 3A and 3B are plots that schematically illustrate transmitted and received FMCW LiDAR signals following linearization of the chirp, in accordance with an embodiment of the invention. A curve 90 shows the frequency variation over time of the transmitted beam, while curves 92 and 94 show the frequency variations of the beams reflected from stationary and moving targets, respectively. The instantaneous frequency difference $f_b$ between curves 90 and 92 is identical in both the up-ramp and down-ramp phases, whereas $f_b$ between curves 90 and 94 has different values during the up-ramp and down-ramp phases of the chirp.

Figure 3C:
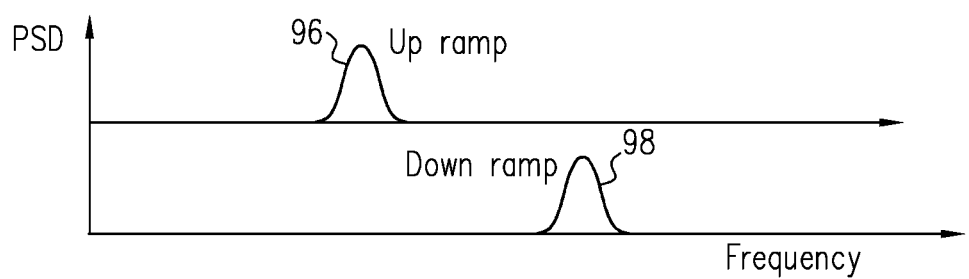
FIG. 3C is a plot that schematically illustrates idealized spectra of beat signals output by an LiDAR system, in accordance with an embodiment of the invention.

FIG. 3C is a plot that schematically illustrates frequency spectra 96 and 98 of beat signals that are generated in the case of a moving target, in the up-ramp and down-ramp phases, respectively, of curves 90 and 94. The power spectral density (PSD) of spectra 96 and 98 has maxima at different peak frequencies as a result of the Doppler shift mentioned above. The range to the target can be derived by averaging the peak frequencies, while the target velocity can be derived from the difference between the peak frequencies. When the target is stationary, the peak frequencies will be the same for the up-ramp and down-ramp phases.

It can be seen by comparing FIGS. 2B and 3B that the PSD peaks in spectra derived from curves 80 and 84 will be broader and centered at different frequencies from those shown in FIG. 3C. In embodiments of the present invention, as noted earlier, the difference between the peak frequencies is used in finding both the range and velocity of the target. To avoid excessive broadening of the PSD peaks in the non-linearized case, which might otherwise degrade the accuracy of the range and velocity measurements, linearization module 72 may apply corrections to both the linearized and non-linearized frequency chirps. These corrections $e_{nl}(t)$ may take the following form, based on the formula for estimating the nonlinear phase component $e(t)$ that is presented above:

$$e_{nl}(t) = \left( \int^t \frac{\overline{\phi}(t')}{\tau_{ref}} + \frac{1}{2} \frac{d\overline{\phi}(t')}{dt'} + \frac{\tau_{ref}}{12} \frac{d^2\overline{\phi}(t')}{dt'^2} + H.O. \right) dt'.$$

wherein $\overline{\phi}(t') = \alpha[e(t') - e(t' - \tau_{ref})]$. For full linearization, module 72 sets the value $\alpha = 1$. For partial correction of the non-linearized chirps, module sets $\alpha$ to a value less than 1, which can also be tuned over the course of the ramp.

Figure 4A:
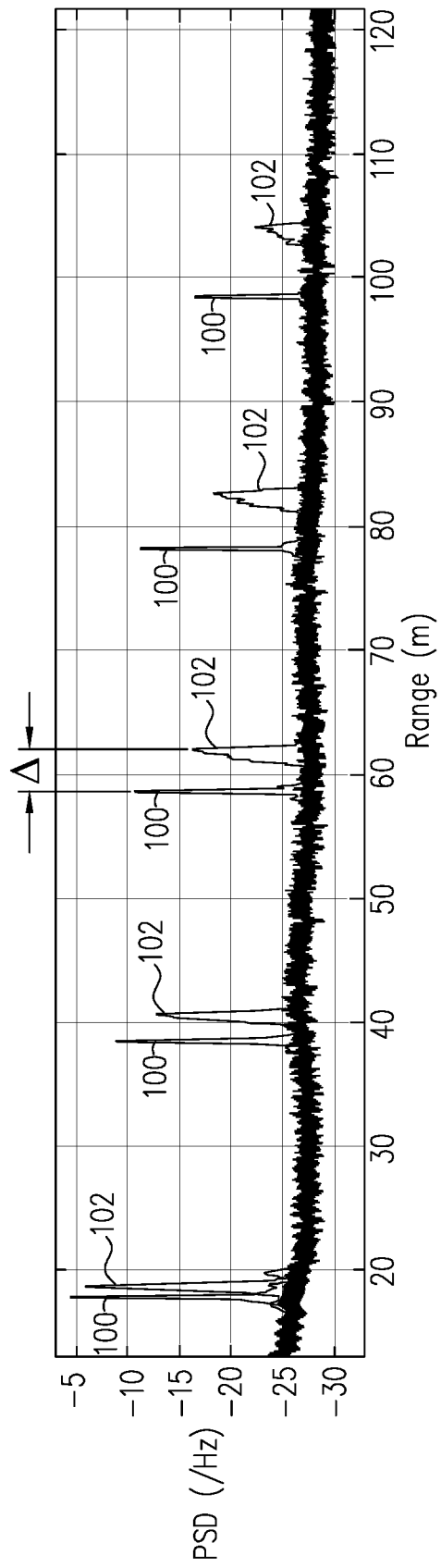
FIGS. 4A and 4B are plots that schematically illustrate spectra of beat signals output by an LiDAR system for targets at different ranges, with and without linearization of the chirp, in accordance with an embodiment of the invention.
Figure 4B:
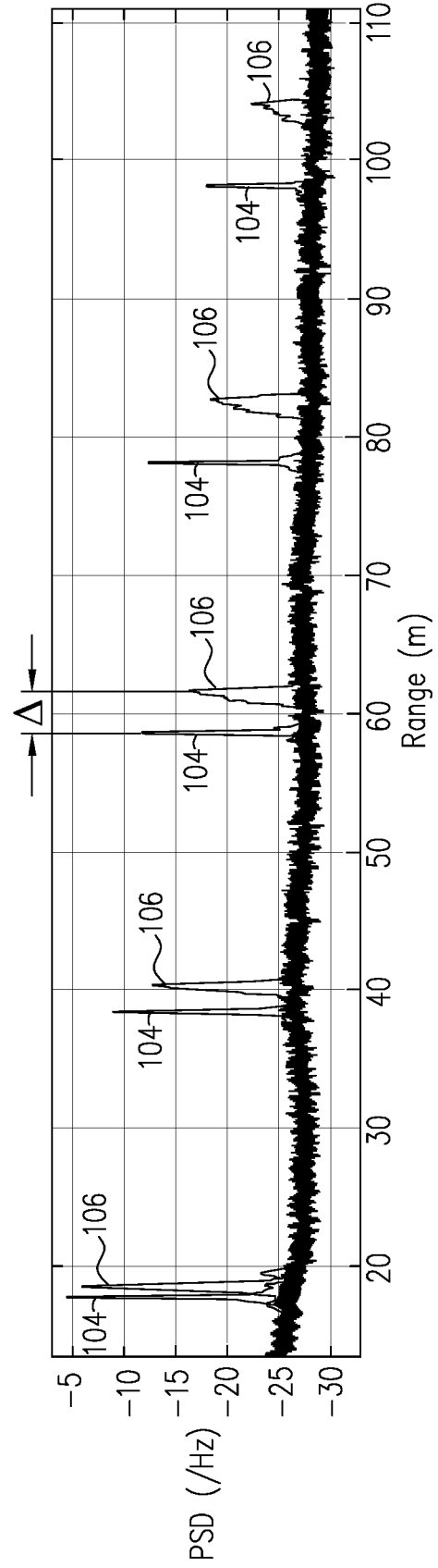

FIGS. 4A and 4B are plots that schematically illustrate frequency spectra of beat signals that are output by detector 66 for targets 22 at different ranges, with and without linearization of the chirp, in accordance with an embodiment of the invention. FIG. 4A shows spectral peaks 100 and 102 of the signals obtained using chirps with and without linearization, respectively, from the up-ramp (or "up slope") phase of the chirps; whereas FIG. 4B shows spectral peaks 104 and 106 obtained using the chirps with and without linearization from the down-ramp ("down slope") phase. In both cases, the spectral peaks are separated by a frequency deviation $\Delta$, which grows with increasing range to the target.

Figure 5A:
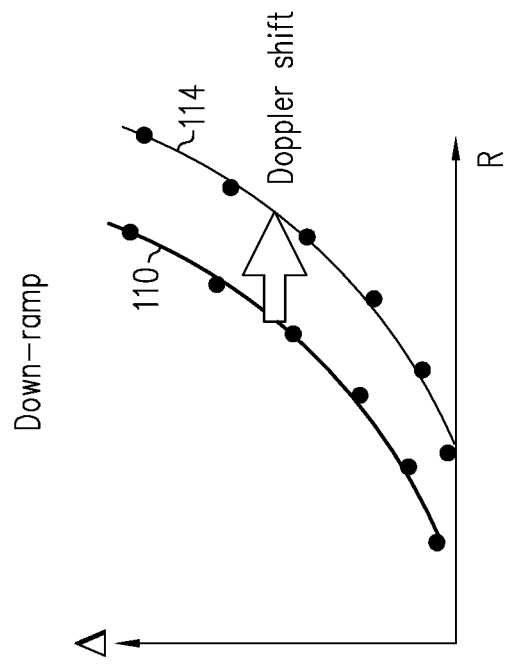
FIGS. 5A and 5B are plots that schematically illustrate a dependence of beat frequency deviation of LiDAR due to chirp nonlinearity on range and target motion, in accordance with an embodiment of the invention.
Figure 5B:
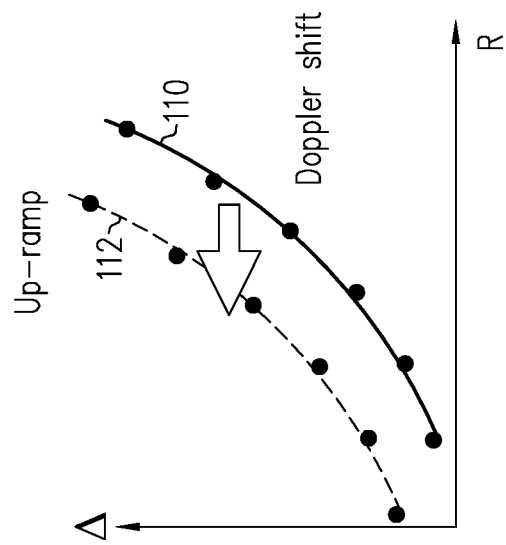

FIGS. 5A and 5B are plots that schematically illustrate the dependence of the beat frequency deviation $\Delta$ on range (R) and target motion, in accordance with an embodiment of the invention. FIG. 5A shows the frequency deviation for the up-ramp phase of the chirp, while FIG. 5B shows the frequency deviation for the down-ramp phase. The dependence of $\Delta$ on the range for a stationary target is shown by a curve 110, while curves 112 and 114 show the dependence of $\Delta$ on the range for a target moving away from the detector. The Doppler shift causes $\Delta$ for any given range R to increase on the up-ramp and decrease on the down-ramp. A target moving toward the detector will have the opposite effect.

The dependence of the beat frequency deviation $\Delta$ on the range of the target, as illustrated by curves 110, 112 and 114, may be calibrated and recorded in memory in system 20. The dependence of $\Delta$ on the target velocity may be calibrated and recorded, as well. The calibration may be updated in real time, while system 20 is in operation, in order to correct for drift that can occur over time. In an embodiment of the present invention, processor 70 applies these records in estimating the range and velocity of the target based on the measured beat frequencies for the chirps with and without linearization. The locations of the spectral peaks for the chirps with and without linearization, taken together with the frequency deviation $\Delta$, indicate both the range and the velocity (speed and direction of movement) of the target unambiguously.

As noted earlier, when linearization module 72 operates in a post-processing mode and applies the linearization to beat signals received from detector 66, processor 70 can extract the beat frequencies for the chirps both with and without linearization from a single phase (up-ramp or down-ramp) of a given chirp. The processor measures and uses the two beat frequencies (linearized and non-linearized) together with the recorded dependence of beat frequency deviation on the target range and velocity. Processor 70 is thus able to measure both the range and velocity of the target based on the beat signal measured over a single phase of the chirp. Consequently, the throughput of system 20 in measuring range and velocity values can be doubled relative to systems that are known in the art, which rely on the difference between the beat frequencies measured on the up-ramp and the down-ramp of a chirp to distinguish stationary from moving targets.

Figure 6A:
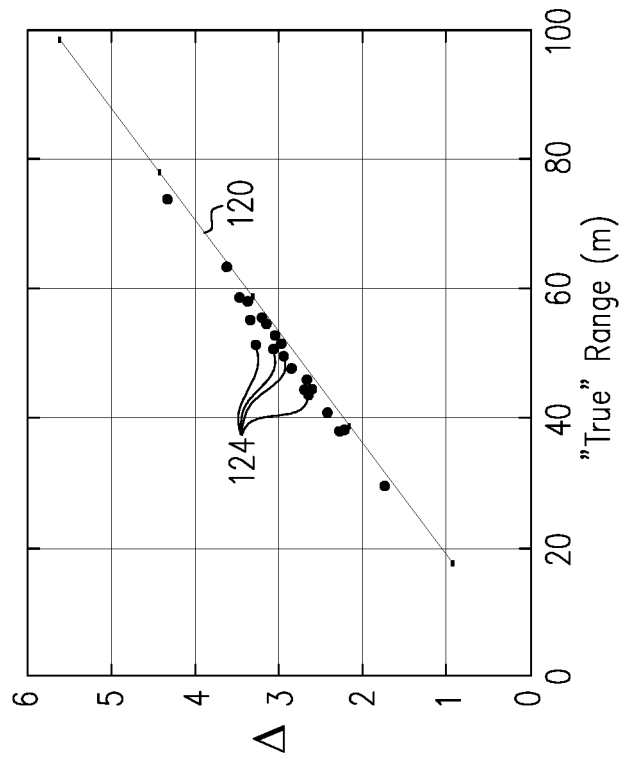
FIGS. 6A and 6B are plots that schematically illustrate a method for range disambiguation of LiDAR using chirp nonlinearity, in accordance with an embodiment of the invention.
Figure 6B:
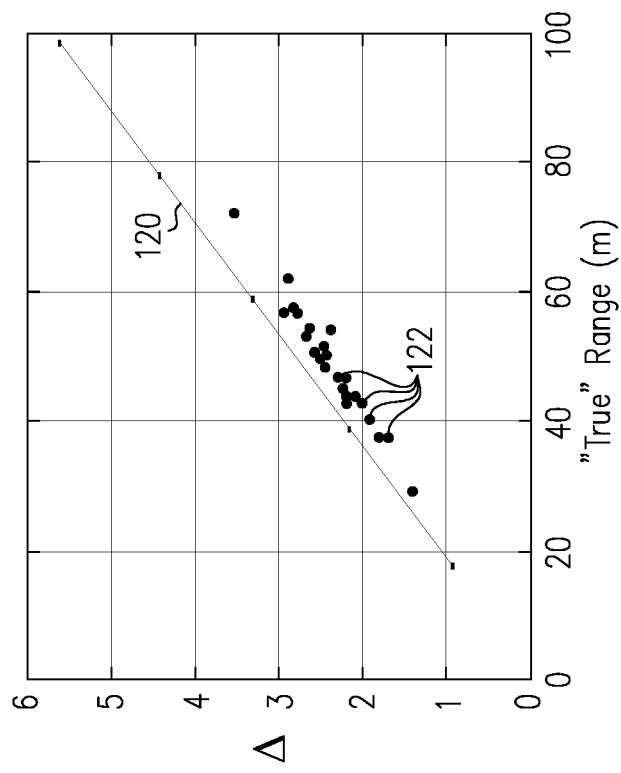

FIGS. 6A and 6B are plots that schematically illustrate a method for range disambiguation of FMCW LiDAR using chirp nonlinearity, in accordance with an embodiment of the invention. FIG. 6A shows the dependence of the frequency deviation on the target range for beat frequencies measured on the up-ramp phase of a chirp, while FIG. 6B shows the dependence for the down-ramp phase. A curve 120 in both figures shows the dependence of A on the target range for a stationary target. Data points 122 and 124 show the values of A measured for moving targets. Thus, for any given pair of linearized and non-linearized beat frequencies, measured on either the up-ramp or down-ramp phase of a chirp, processor 70 is able to determine whether the corresponding target is stationary, moving toward the detector, or moving away from the detector, depending upon whether the frequency deviation $\Delta$ is above or below curve 120. Furthermore, the distance of the corresponding data point 122 or 124 from curve 120 is indicative of the speed of movement of the target.

The dependence of the frequency deviation $\Delta$ on the target range can also be used in disambiguating range and velocity measurements when system 20 receives multiple incoming beams reflected from multiple targets. In this case, processor 70 will extract two or more different beat frequencies from the signals output by detector 66 with a linearized frequency chirp, and will likewise extract multiple beat frequencies from signals output by the detector without linearizing the frequency chirp. Processor 70 compares the beat frequencies in order to find two or more values of A and to check these values against curve 120. In this manner, processor 70 can determine, for example, that one of the targets is moving, because the corresponding value of A is above or below curve 120, while the other target is stationary, because the corresponding value of A falls on curve 120. By the same token, the processor can find that the other target is moving with a different velocity in the same or opposite direction. When neither target is moving, incorrectly pairing the peaks will make it appears as though both targets are moving (and will assign an incorrect range). By comparing this result with the corresponding A, it can be determined that the result is inconsistent, so that only the correct pairing remains.

It will be appreciated that the embodiments described above are cited by way of example, and that the present invention is not limited to what has been particularly shown and described above. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Range sensing apparatus, comprising:
   a light source, which is configured to transmit an outgoing beam of optical radiation toward a target;
   a modulator, which is coupled to apply a frequency chirp to the light source, which causes a nonlinear variation in a frequency of the outgoing beam over a period of the frequency chirp;
   a detector, which is configured to receive both a portion of the outgoing beam and a reflection of the outgoing beam from the target, and to output beat signals corresponding to a frequency difference between the outgoing and reflected beams; and
   a processor, which is configured to linearize the frequency chirp, to receive a first beat signal from the detector responsively to the linearized frequency chirp, to receive a second beat signal from the detector without linearizing the frequency chirp, and to measure a range and velocity of the target based on a comparison of the first and second beat signals.

2. The apparatus according to claim 1, wherein the processor is configured to extract a first beat frequency from the first beat signal and to extract a second beat frequency from the second beat signal, and to measure the range and velocity of the target based on the first and second beat frequencies.

3. The apparatus according to claim 1, wherein the processor is configured to drive the modulator so as to linearize the frequency chirp that is applied to the light source.

4. The apparatus according to claim 1, wherein the processor is configured to correct a phase error in the beat signal so as to linearize the frequency chirp.

5. The apparatus according to claim 4, wherein the frequency chirp comprises multiple phases, including alternating up-ramp phases and down-ramp phases, and wherein the processor is configured to extract both a first beat frequency and a second beat frequency from a single one of the phases, and to measure the range and velocity of the target based on the first and second beat frequencies.

6. The apparatus according to claim 1, wherein the detector is configured to receive multiple incoming beams reflected from multiple targets, and wherein the processor is configured to extract multiple first beat frequencies from the first beat signal, to extract multiple second beat frequencies from the second beat signal, and to disambiguate respective ranges and velocities of the multiple targets by comparing the multiple first and second beat frequencies.

7. The apparatus according to claim 1, wherein the processor is configured to store a record of a dependence of a deviation between the first and second beat signals on the range of the target, and to apply the record in measuring the range and velocity based on the first and second beat signals.

8. The apparatus according to claim 7, wherein the record is indicative of the dependence of the deviation between the first and second beat signals on the range and velocity of a target, and wherein the processor is configured to measure the deviation between the first and second beat signals, and to compare the measured difference to the difference indicated by the record in order to estimate a direction and speed of movement of a moving target.

9. A method for range sensing, comprising:
   transmitting an outgoing beam of optical radiation toward a target while applying a frequency chirp to cause a nonlinear variation in a frequency of the outgoing beam over a period of the frequency chirp;
   receiving in a detector both a portion of the outgoing beam and a reflection of the outgoing beam from the target, so that the detector outputs beat signals corresponding to a frequency difference between the outgoing and reflected beams; and
   linearizing the frequency chirp and receiving a first beat signal from the detector responsively to the linearized frequency chirp;
   receiving a second beat signal from the detector without linearizing the frequency chirp; and
   measuring a range and velocity of the target based on a comparison of the first and second beat signals.

10. The method according to claim 9, wherein measuring the range and velocity comprises extracting a first beat frequency from the first beat signal, extracting a second beat frequency from the second beat signal, and measuring the range and velocity of the target based on the first and second beat frequencies.

11. The method according to claim 9, wherein applying the frequency chirp comprises applying a modulator to a light source that generates the outgoing beam, and wherein linearizing the frequency chirp comprises driving the modulator so as to linearize the frequency chirp that is applied to the light source.

12. The method according to claim 9, wherein linearizing the frequency chirp comprises correcting a phase error in the beat signal so as to linearize the frequency chirp.

13. The method according to claim 12, wherein the frequency chirp comprises multiple phases, including alternating up-ramp phases and down-ramp phases, and
   wherein measuring the range and velocity comprises extracting a first beat frequency and a second beat frequency from a single one of the phases, and measuring the range and velocity of the target based on the first and second beat frequencies.

14. The method according to claim 9, wherein receiving the reflection of the outgoing beam comprises receiving in the detector multiple incoming beams reflected from multiple targets, and
   wherein measuring the range and velocity comprises extracting multiple first beat frequencies from the first beat signal, extracting multiple second beat frequencies from the second beat signal, and disambiguating respective ranges and velocities of the multiple targets by comparing the multiple first and second beat frequencies.

15. The method according to claim 9, wherein measuring the range and velocity comprises storing a record of a dependence of a deviation between the first and second beat signals on the range of the target, and applying the record in measuring the range and velocity based on the first and second beat signals.

16. The method according to claim 15, wherein the record is indicative of the dependence of the deviation between the first and second beat signals on the range and velocity of a target, and wherein measuring the range and velocity comprises measuring the deviation between the first and second beat signals, and comparing the measured difference to the difference indicated by the record in order to estimate a direction and speed of movement of a moving target.

\* \* \* \* \*